(12) United States Patent
Verissimo de Oliveira

(10) Patent No.: US 8,793,708 B2
(45) Date of Patent: Jul. 29, 2014

(54) CREATION AND TERMINATION OF COMPONENT SCOPES

(75) Inventor: Hamilton Verissimo de Oliveira, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 273 days.

(21) Appl. No.: 12/962,654

(22) Filed: Dec. 8, 2010

(65) Prior Publication Data

US 2012/0151505 A1  Jun. 14, 2012

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC .......................................................... 719/328

(58) Field of Classification Search
USPC .......................................................... 719/328
See application file for complete search history.

(56) References Cited

U.S. PATENT DOCUMENTS

| | | | |
|---|---|---|---|
| 2006/0075381 A1* | 4/2006 | Laborczfalvi et al. | 717/100 |
| 2006/0218536 A1* | 9/2006 | Kirilline et al. | 717/127 |
| 2008/0077941 A1 | 3/2008 | Holmes | |
| 2008/0276231 A1* | 11/2008 | Huang et al. | 717/145 |
| 2010/0161632 A1* | 6/2010 | Rosen | 707/758 |

OTHER PUBLICATIONS

Introduction to the Spring Framework; May 1, 2005; 6 Pages; http://www.theserverside.com/news/1364527/Introduction-to-the-Spring-Framework.
Lionel Seinturier, et al.; A Component Mode Engineered with Components and Aspects; 2006; pp. 1-15.
Emerging Standards and Futures in Enterprise Integration; Mar. 8, 2008; pp. 1-13; http://www.eaipatterns.com/Future.html.
.NET Application Extensibility; Sep. 28, 2010; pp. 1-6; http://msdn.microsoft.com/en-us/magazine/cc163476 (printer).aspx.
Eini, Oren, "Inversion of Control and Dependency Injection: Working with Windsor Container", Nov. 2006, pp. 17, http://msdn.microsoft.com/en-us/library/aa973811(printer).aspx.
Object Lifetime Manager: A Complementary Pattern for Controlling Object Creation and Destruction, May 21, 2008, pp. 8.
"Chinese First Office Action", Mail Date: Jan. 27, 2014, Application No. 201110418057.X, Filed date: Dec. 7, 2011, pp. 11.

* cited by examiner

*Primary Examiner* — Andy Ho
*Assistant Examiner* — Timothy A Mudrick
(74) *Attorney, Agent, or Firm* — Kevin Sullivan; Kate Drakos; Micky Minhas

(57) ABSTRACT

The subject disclosure relates to creation and management of component scopes in a computing system. As described herein, an automated scope generation mechanism establishes application modules and their scopes and dependencies in an application-independent manner, hiding the complexity of scope management from the corresponding applications. As additionally described herein, automated scope generation and management techniques can be implemented in the context of a variety of application types, such as document editors and network request processors. Further, techniques are described herein by which a scope manager can implement static checking for scope validity based on scope hierarchy analysis and/or other factors.

20 Claims, 12 Drawing Sheets

CREATION AND TERMINATION OF COMPONENT SCOPES

TECHNICAL FIELD

The subject disclosure relates to modular computing system management, e.g., creating and terminating component scopes within a modular computing application.

BACKGROUND

Composition containers, also referred to in the art as dependency containers, dependency injection containers, inversion of control containers, etc., are component frameworks that are utilized to connect application modules and/or other components together. Composition containers operate by reading or inferring dependencies expressed in components and attempting to satisfy the dependencies by using instances and/or values from other components. A composition container has ownership of component instances it creates, thereby defining a lifetime and accessibility boundaries for such instances.

For some applications, however, conventional composition containers do not provide sufficient scoping granularity for lifetime and/or accessibility. For example, a multi-document application may desire to have its own copy of respective components (e.g., text buffer, undo manager, spell checker, etc.) per document opened. In order to achieve this in conventional implementations, components are required to set their own scope semantics (e.g., start a new scope when a new document is created, etc.) that handle the associated infrastructure logic. Accordingly, the component implementation is coupled with a particular composition container, making it less reusable and less testable as well as making its code less expressive.

The above-described deficiencies of today's computing system management techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In various embodiments, an automated scope generation mechanism is introduced that establishes application modules and their scopes and dependencies in an application-independent manner. In one embodiment, a program component scoping management system includes an application component configured to provide or provide access to service(s) via one or more application module components. The system also can include a scope generator component configured to receive information from the application component relating to a requested scope corresponding to a selected application module component, create a composition container relating to respective dependencies of the selected application module component, create the requested scope, and assign the requested scope to the composition container in response to the information received from the application component. For instance, at least a portion of the application module components can correspond to application windows.

In another embodiment, a method for managing component scopes in a computing system comprises obtaining information relating to a requested scope for one or more application modules from an application associated with the one or more application modules, creating a composition container relating to respective dependencies of the one or more application modules, creating the requested scope for the one or more application modules and associating the requested scope with the composition container.

In another embodiment, an application request processing method includes identifying a new requestor entity in association with at least one application, submitting a request for creation of a scope corresponding to the new requestor entity, obtaining information relating to the scope corresponding to the new requestor entity in response to the request and processing requests from the new requestor entity according to the scope corresponding to the new requestor entity.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

Figure 1:
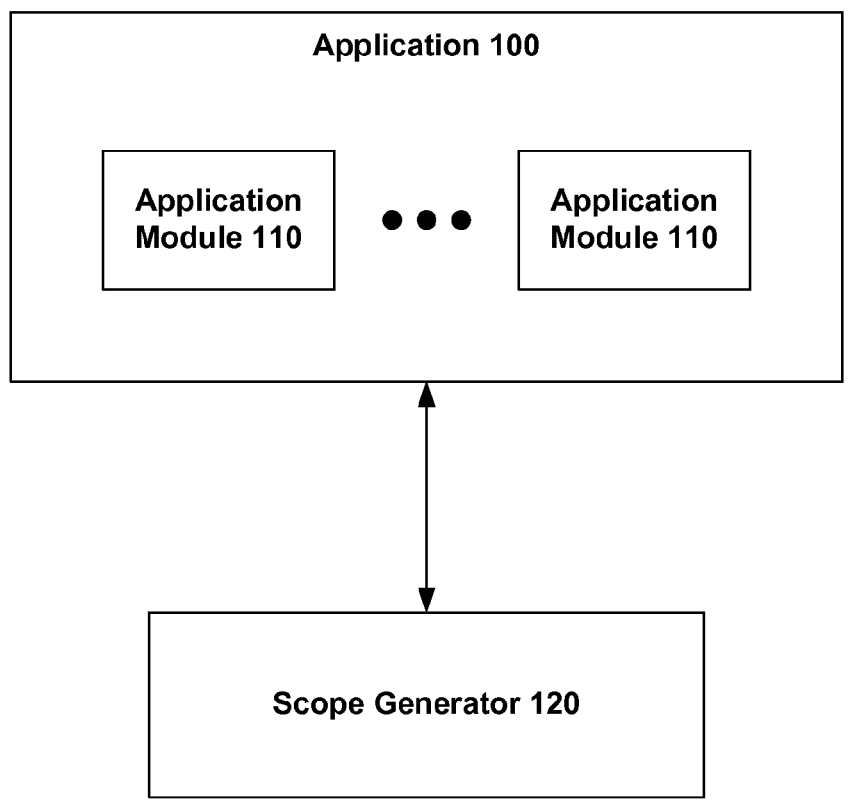
FIG. 1 is a block diagram showing a simplified view of a scoping management system in accordance with one or more embodiments.

By way of introduction, software components of a computing system, such as applications, operating systems, etc., can be designed in a modular manner through the use of code blocks and/or other suitable structures. Code blocks can include, e.g., modules, classes, and/or any other suitable elements of program code or the like. In some cases, code blocks corresponding to a computing system can be attached and/or otherwise associated with each other through dependencies or other means. In the event that the number of dependencies for a given code block is significant, entanglement between code blocks can occur that gives rise to difficulties in determining distinct boundaries between respective code blocks.

Accordingly, in one or more embodiments, an automated scope generation mechanism is introduced that establishes application modules and their scopes and dependencies in an application-independent manner. The scope generator hides the complexity of scope management from the applications running on a computing system, thereby increasing system efficiency and reducing application code complexity.

In one example, given that a moderately complex componentized project defines, constructs and terminates isolated boundaries of composition for lifetime and/or accessibility needs, a new idiom is presented herein to communicate this intention in a way that is decoupled from specific composition containers, and provides testability and reusability. This idiom is based on a type that defines a "gate" to a predefined scope. When used by components within a composition container, it communicates statically the intention of controlling an isolated boundary (e.g., scope) at some point during the code execution of the component.

The scope management techniques described herein can be implemented generally for a variety of applications. For example, various examples are provided herein for scope management using an automated scope generator in the context of a document editor application, a network request processing application, and other applications. In other examples provided herein, a scope manager can implement static checking for scope validity based on scope hierarchy analysis and/or other factors, thereby providing additional functionality over that provided by conventional scoping mechanisms.

Conventionally, as identifying dependencies between code blocks is a complicated procedure, structures such as composition containers (CCs), dependency injection containers, inversion of control containers, or the like are utilized that assemble respective module and return each respective module in an assembled and ready-to-use format. In one example, a CC utilizes information based on conventions, standard interfaces, or the like to ascertain the manner in which components are to be connected together.

In an embodiment, complex dependencies in modular applications can be designed beginning from the premise that the dependencies are separate and subsequently utilizing a CC as a vehicle for integrating the dependencies. Alternatively, manual analysis can be performed to assemble dependencies; however, as an application grows and its number of dependencies increases (e.g., on the order of thousands for some application types), manual dependency analysis becomes infeasible. Accordingly, a CC and/or other means can be utilized to analyze the components and, given a convention and/or other suitable means, obtain an understanding of how the various components depend on each other.

In another embodiment, a CC operates according to dependency injection, which is a technique utilized in object-oriented programming to supply external dependencies to a software component. A CC can be implemented as a design pattern that separates behavior from dependency resolution, thereby decoupling dependent components. For example, instead of hard-coding dependencies, dependency injection can be utilized to enable a component to merely list its applicable services, based on which a dependency injection framework can provide the listed services. Without dependency injection, it can be appreciated that a component that has to use a given service to accomplish a task depends not only on the interface of the service but also on the implementation details of the service. Thus, the component is required to handle both its use of the service and the lifecycle of that service. In contrast, by using dependency injection, the lifecycle of a service is handled by a dependency provider, such as a CC, instead of the component. In one example, the CC is an independent, external component that links the consuming component of a service and the providing component. Accordingly, the consumer needs only a reference to an implementation of the service in order to accomplish its task. In one example, dependency injection can be utilized to decouple high-level modules from low-level services. As a result, CCs and/or other mechanisms for dependency injection provide dependency inversion functionality.

By way of specific non-limiting example, a CC and/or other dependency injection mechanisms can provide functionality to implement dependencies for a document editor component. For example, in order to save a document, the document editor may depend on components such as a file system manager, a spell checker, or the like. Accordingly, a CC can be utilized to integrate the components on which the document editor depends to facilitate correct operation of the document editor.

However, CCs and other such structures experience difficulties with respect to scoping. By way of example, in the case of a document editor application, it may be desirable to utilize separate scoping for respective open documents. Thus, for instance, instead of utilizing a single spell checker copy for multiple open documents, a distinct spell checker copy can be provided via scoping for respective documents. Conventionally, this is managed by utilizing one CC for each scope, such that for each new document a new CC is created that has control over a set of components relating to the document. However, it can be appreciated that for a component to be reusable, the component should be decoupled from its environment such that it is unaware that there is an entity that assembles it together. In contrast, if new scopes are manually created as in existing implementations, a component is required that has knowledge of the CC structure, creates a new CC, and starts a new scope each time a new scope is desired. In view of at least the above shortcomings of conventional computing system management techniques, various embodiments described herein provide improved scoping management by hiding scope creation and exposing a scope gate, herein also referred to a scope generator, that can be utilized in an application-independent manner to create new scopes automatically.

In one embodiment, a program component scoping management system includes an application component configured to provide at least one service via one or more application module components. The system additionally includes a scope generator component configured to receive information relating to a requested scope corresponding to a selected application module component of the one or more application module components from the application component and to automatically create a composition container relating to respective dependencies of the selected application module component, create the requested scope, and assign the requested scope to the composition container in response to the information received from the application component.

In some implementations, at least a portion of the one or more application module components correspond to application windows. Additionally or alternatively, the requested scope can correspond to an entity submitting one or more requests according to the at least one service.

In one example, the scope generator component includes a scope analysis component configured to verify validity of the requested scope and to prevent creation of the composition container if the requested scope is determined to be invalid. The scope analysis component can be further configured to obtain information relating to a scope associated with the selected application module component and to verify validity of the requested scope at least in part by determining whether the requested scope is accessible from the scope associated with the application module component.

In other examples, the scope generator component is associated with a composition container corresponding to a parent application module component of the selected application module component. In still other examples, the scope generator component is further configured to create the requested scope based at least in part on a static generic parameter that defines the one or more application module components.

The scope generator component, in various implementations, can include a composition container setup component configured to create the composition container. In such an example, the scope generator component can create the requested scope and assign the requested scope to the composition container created by the composition container setup component. In further examples, the application component is further configured to submit the information relating to the requested scope to the scope generator component via an application programming interface (API) associated with the scope generator component.

In another embodiment, a method for managing component scopes in a computing system includes obtaining information relating to a requested scope for one or more application modules from an application associated with the one or more application modules, creating a composition container relating to respective dependencies of the one or more application modules, creating the requested scope for the one or more application modules, and associating the requested scope with the composition container.

In some implementations, the method additionally includes verifying validity of the requested scope and abstaining from creating the requested scope if the requested scope is invalid. The verifying can include, e.g., identifying a requestor scope associated with the information relating to the requested scope and verifying that the requested scope is accessible by the requestor scope.

In one example, creating the requested scope can include creating the requested scope based at least in part on a static parameter that generically defines the one or more application modules. In another example, the obtaining can include obtaining the information relating to the requested scope from the application via a scoping API call. In a further example, creation of a composition container can include creating the composition container independently of the application and creation of the requested scope can include creating the requested scope independently of the application.

In still other implementations, the method can include obtaining information relating to at least one to-be-terminated scope from the application and terminating the at least one to-be-terminated scope.

In an additional embodiment, an application request processing method includes identifying a new requestor entity in association with at least one application, submitting a request for creation of a scope corresponding to the new requestor entity, obtaining information relating to the scope corresponding to the new requestor entity in response to the request, and processing requests from the new requestor entity according to the scope corresponding to the new requestor entity.

In one example, the method further includes terminating the scope corresponding to the new requestor entity in response to completion of activity by the new requestor entity. Additionally or alternatively, the submitting can include submitting the request via a scoping management API. In another example, the processing can include identifying a plurality of requestor entities including the new requestor entity and processing requests from the plurality of requestor entities according to scopes respectively associated with the plurality of requestor entities.

Herein, an overview of some of the embodiments for achieving scope creation and termination in a computing system has been presented above. As a roadmap for what follows next, various exemplary, non-limiting embodiments and features for distributed transaction management are described in more detail. Then, some non-limiting implementations and examples are given for additional illustration, followed by representative network and computing environments in which such embodiments and/or features can be implemented.

Establishment and Termination of Component Scopes

By way of further description with respect to one or more non-limiting ways to conduct scoping management in a modular computing environment, a block diagram of an exemplary scoping management system is illustrated generally by FIG. 1. The system illustrated by FIG. 1 includes an application component 100, which can be coded and/or otherwise implemented in a modular manner, e.g., using one or more application module components 110. As stated above, conventional computing systems have no mechanisms by which scope can be controlled outside of individual applications, which causes a significant increase in application complexity. In contrast, the system illustrated by FIG. 1 utilizes a scope generator component 120 that hides the complexity of scope generation and management from the application component 100 and its application module components 110. Accordingly, scope generator component 120 can be configured to perform component setup, scoping, and other suitable operations in an automatic and application-independent manner, enabling higher versatility, reusability, and testability of application module components 110.

In accordance with various embodiments, the system illustrated by FIG. 1 can be implemented in any suitable computing environment and for any suitable application type(s). For example, the system illustrated by FIG. 1, as well as the other embodiments described and illustrated herein, can be utilized on a client computing machine, server, smartphone, personal digital assistant (PDA), and/or any other suitable device(s). Further, the embodiments described herein can be utilized for applications such as, e.g., document editors, network applications, programming tools, or the like.

Figure 2:
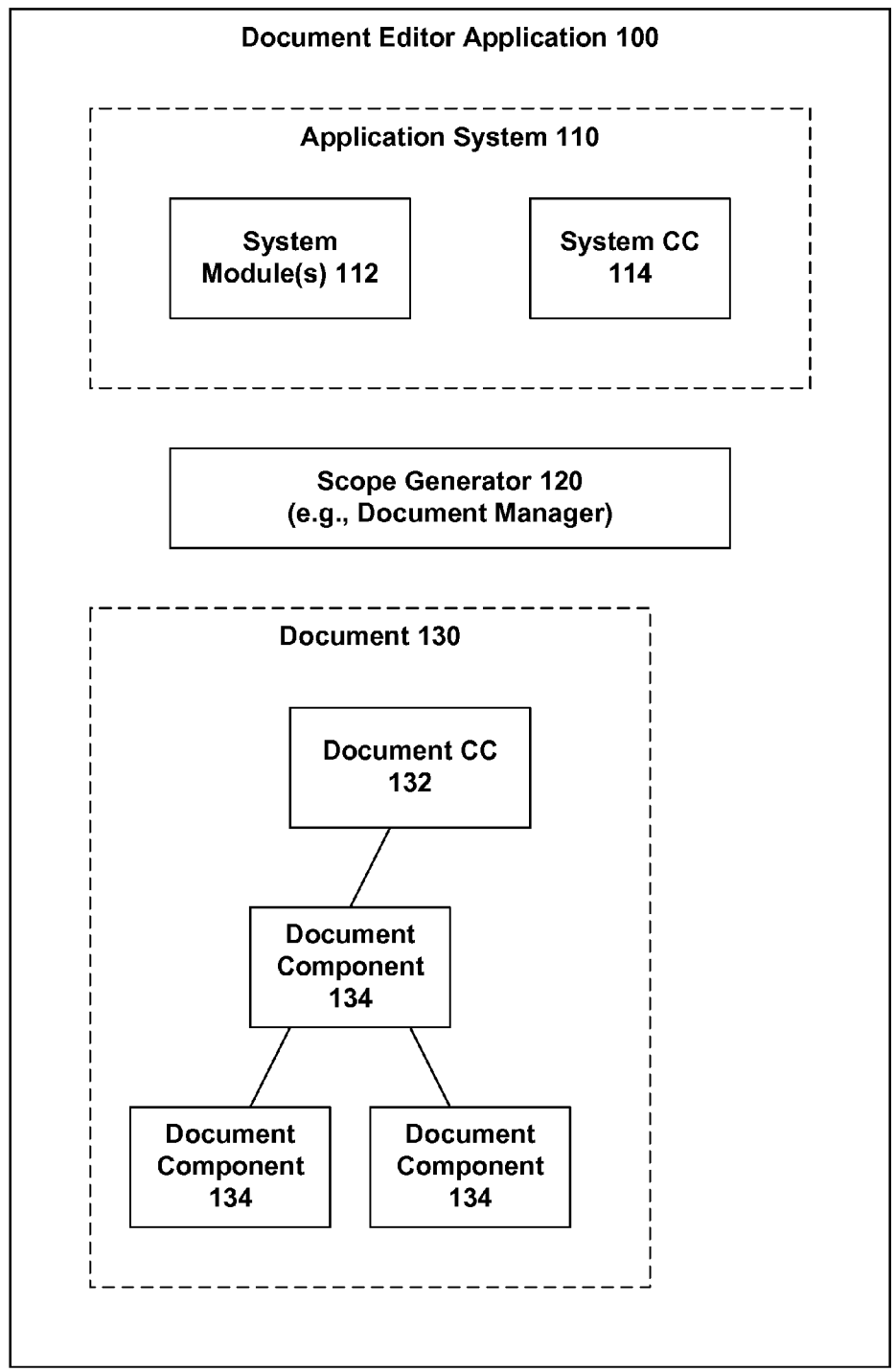
FIGS. 2-3 are block diagrams showing respective exemplary document editor applications that can implement one or more embodiments.

As a specific, non-limiting example of a system in which the embodiments described herein can be implemented, FIG. 2 illustrates a document editing system associated with a document editor application 200. The document editor application 200 includes an application system 210, which is composed of one or more system modules 212. Further, the application system 210 utilizes a system CC 214. The document editor application 200 is utilized to edit one or more documents 230. The documents, in turn, can be associated with a document CC 232 that assembles respective dependencies for the document 230 corresponding to document components 234. In contrast to conventional systems in which a document CC 232 corresponding to a given document 230 is generated directly by the application system 210, application system 210 can, in one embodiment, utilize a scope generator 220 as described herein to hide scoping complexity from the application system 210 and automate scoping for respective documents 230. Scope generator 220 can be implemented as a document manager and/or any other suitable mechanism(s).

Figure 3:
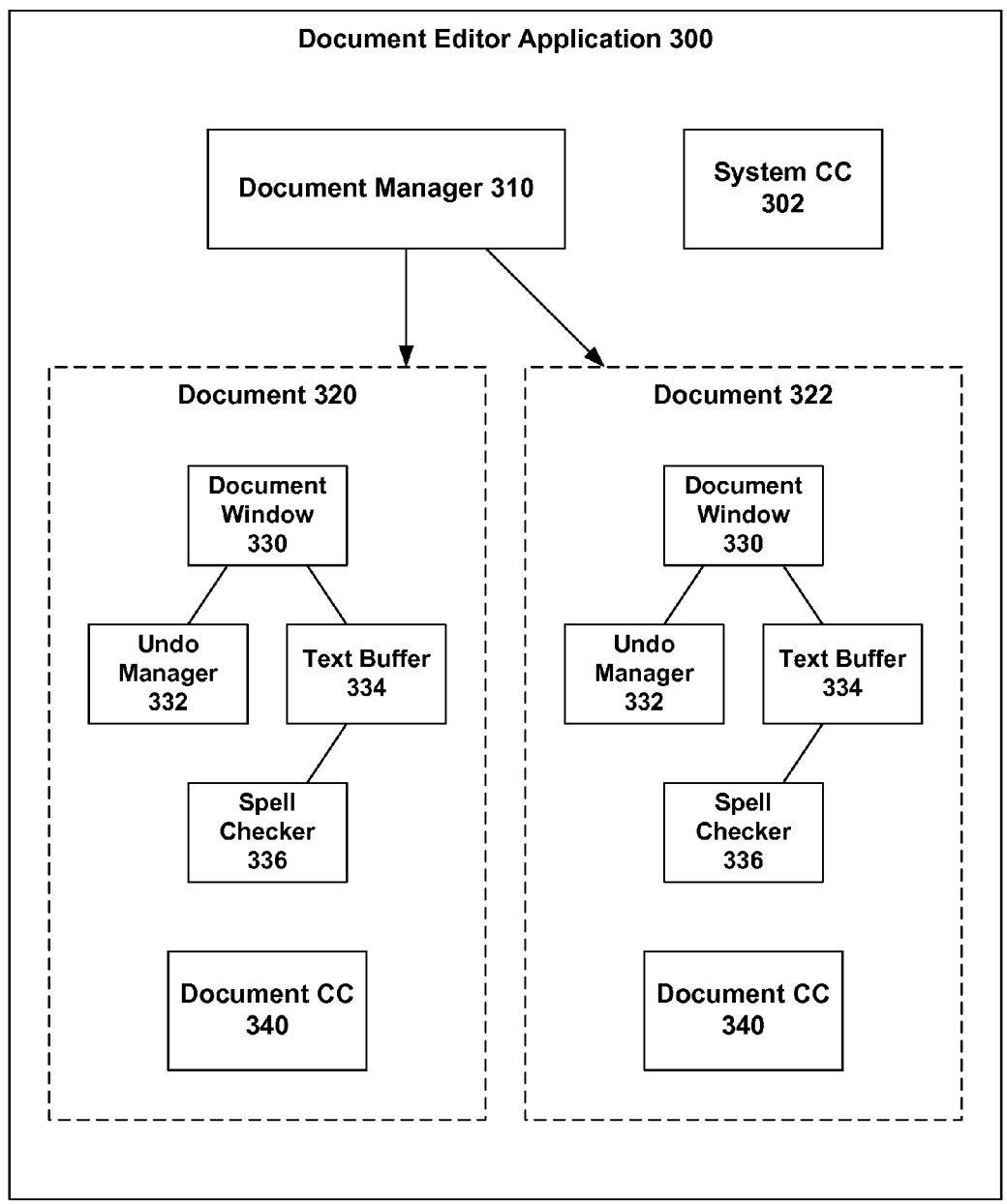

As another non-limiting system, FIG. 3 illustrates a document editor application 300 that utilizes a document manager 310 to manage respective documents 320-322. As shown in FIG. 3, documents 320-322 are associated with a document window 330, which are in turn associated with other resources utilized by the respective documents 320-322, such as an undo manager 332, a text buffer 334 that holds the states of respective typed characters, a spell checker 336 that depends on the text buffer 334, and so on. In the event that a new document is to be created, document manager 310 can act to start a new scope independent of the documents 320-322. In one example, document manager 310 can initially create a document CC 340 corresponding to a newly created document 320-322 by determining the components to be associated with the document 320-322 and their order.

For a system in which multiple documents 320-322 are to be edited, scoping presents challenges as multiple window instances corresponding to the documents 320-322 are utilized that each are to have individual undo managers 332, text buffers 334, spell checkers 336, and the like. It can be appreciated that errors can be propagated between documents if multiple component instances are not utilized. For example, if only a single text buffer instance is shared between multiple documents, characters typed in a first document will overwrite characters typed in a second document.

While separate component instances can be created for each document 320-322, problems arise in communicating the new scopes to the document manager 310. While in conventional systems a document manager is capable of understanding dependencies on a basic level, such document managers are unable to read the fact that scoping is required. Accordingly, document manager 310 can leverage the functionality of a scope generator (e.g., scope generator component 120) to create a new scope corresponding to each document 320-322. In one example, a scope generator can be invoked by the document manager 310 and/or other suitable elements of the system shown in FIG. 3 via a scope management API and/or other suitable means. In one example, when the document editor application 300 is first run there are no open documents 320-322. Subsequently, when a document is created for the first time a first scope is created, and a new document CC 340 is transparently created with the components that are utilized for the scope. As other documents are created, new document CCs 340 are created in a similar manner. In another example, a list of open documents can be maintained by the document editor application along with a system CC 302. In an additional example, as a user switches between open documents, the document editor application 300 can continue to maintain information relating to respective open documents 320-322, as changes to the document of focus results in only visual changes and do not affect scoping.

Figure 4:
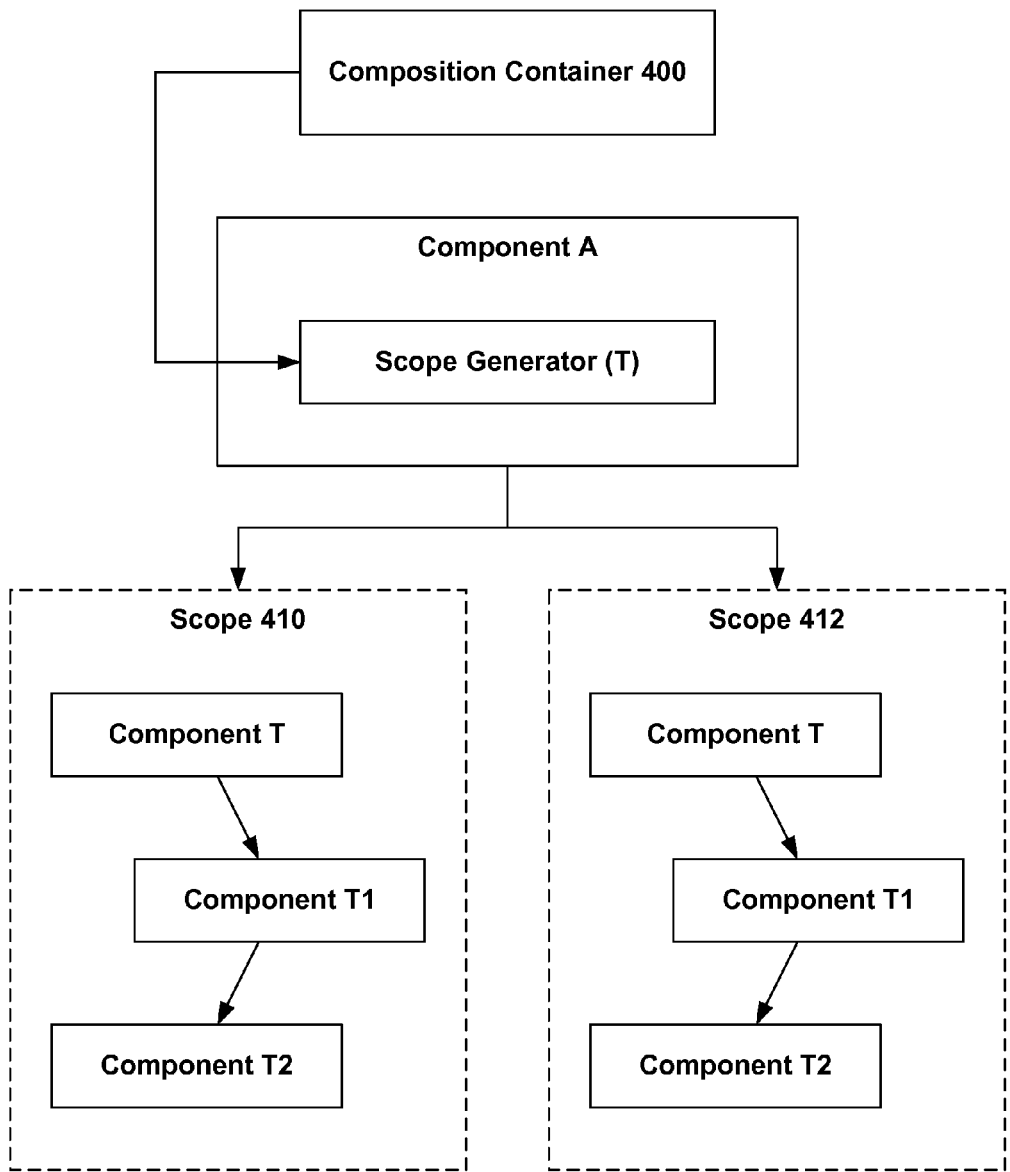
FIG. 4 is an illustrative view of an exemplary application scope structure in accordance with one or more embodiments.

Referring next to FIG. 4, an exemplary application scope structure is illustrated. The system includes a component A, which is associated with, e.g., an application, an operating system, or the like. Further, component A is associated with a composition container 400 and a scope generator. As noted above, control of isolated boundaries of composition occurs in several application models. For instance, server-side applications can utilize isolated boundaries of composition in the context of a web model based on short lived requests. As another example, such boundaries can be utilized whenever state and accessibility are to be controlled (e.g., as opposed to shared or globally accessible) in a desktop application, as is the case in the multi-document applications described above and/or other suitable applications.

In an embodiment, the system shown in FIG. 4 can utilize an idiom manifested by a common type. This type takes a static generic parameter (e.g., T) that defines the component and/or contract on which it depends. Component A can then utilize this idiom combined with the way it expresses a standard dependency. In one example, the parameter T expresses to composition container 400 that component A desires to control a predefined scope 410 and/or 412 being used for various purposes: firstly to determine the pre-defined scope to create, and secondly to enable static and runtime analysis to determine if the scope is accessible from the requestor scope. Such analysis can be utilized, for example, in a system in which scopes are hierarchical. Such scope analysis is described in further detail herein.

As compared to conventional systems, it can be appreciated that frameworks that do not utilize the embodiments described herein rely on complex APIs do achieve the same results without the benefit of static analysis.

In an embodiment, component A can correspond to any suitable application, such as a document editor, a web-based application, or the like. By way of non-limiting example, component T as shown in association with scopes 410-412 can correspond to a window, and components T1 and T2 can correspond to dependent components of the window. In one example, the scope generator is utilized by component A to generalize CC and scope creation. For example, it can be appreciated that custom scoping code for a conventional blogging application could not be utilized for other conventional applications. In contrast, the scope generator shown in FIG. 4 can be utilized to address scope management across many different types of applications. In another example, prior to generation of scopes 410-412, parameter T can be utilized as a placeholder until replaced by a concrete scope. Thus, for example, in the event that T corresponds to a window, the scope generator returns a window upon being executed for the first time.

In another embodiment, the scope generator can be utilized to regulate the lifetime of a scope. By way of example, the lifetime of a scope corresponding to a document spans from the time the document is created to the time the document is closed. Likewise, the lifetime of a scope corresponding to a network request spans from the time the request is made to the time the request is fulfilled.

Figure 5:
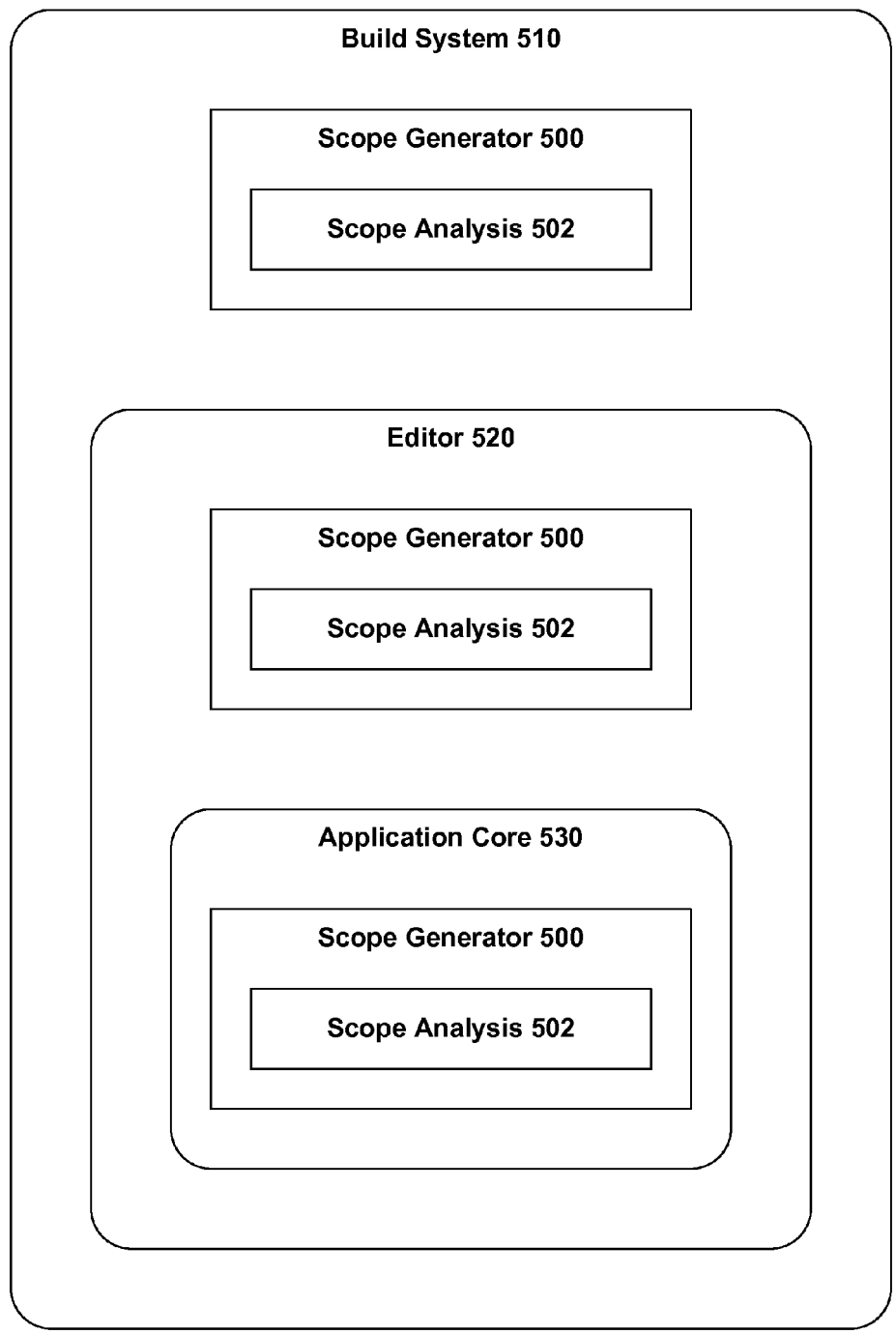
FIG. 5 is a block diagram showing a hierarchical scope management system in accordance with one or more embodiments.

In some embodiments, scoping management as provided herein can be utilized in the context of a hierarchical system. By way of specific example as shown by FIG. 5, an application can utilize a hierarchical structure including a build system 510, which encompasses an editor 520, which in turn encompasses an application core 530. As shown in FIG. 5, layers 510-530 can additionally be associated with a scope generator 500, which can operate as generally described herein. In one example, scope generator 500 can include a scope analysis component 502, which can be utilized to perform static analysis on scope generation requests. For example, scope analysis component 502 can check to determine whether creation of a scope is possible given the scope hierarchy of the system and/or other factors. If the scope cannot be created, scope analysis component 502 can prevent the scope from being created and/or otherwise cause scope generator component 500 from creating the scope.

Scope analysis component 502 can analyze a potential scope based on various criteria. For example, scope analysis component 502 can determine if a given scope is valid and/or accessible. Accordingly, if a scope generator of a given layer attempts to create a scope corresponding to a new window, but the window is outside of the layer, a call to the scope generator at that layer can be configured to fail.

By providing application-independent scoping management, it can be appreciated that scope analysis and other operations are facilitated that are not possible under conventional implementations. Further, it can be appreciated that reusability of components is increased, since as the dependencies on a component decrease the reusability of that component increases.

Figure 6:
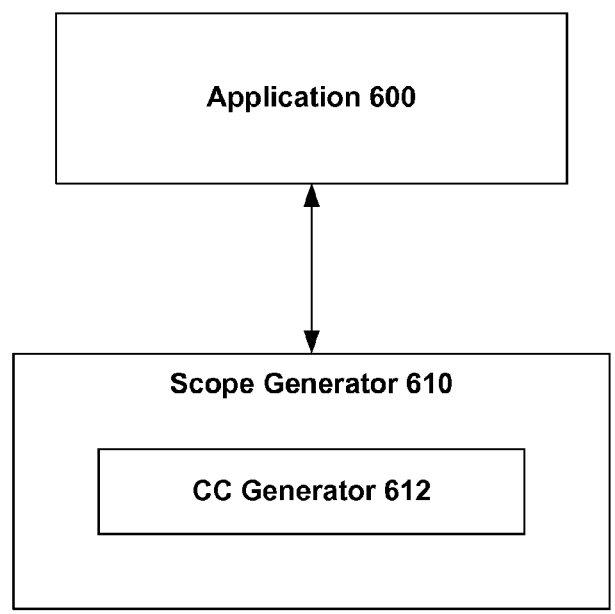
FIG. 6 is a block diagram showing a composition container creation and scoping system in accordance with one or more embodiments.

In various embodiments provided above, a scope generator is utilized to create a CC corresponding to a given scope as well as to create the scope itself. However, a scope generator component 610 can alternatively operate as shown in FIG. 6, wherein setup of a CC and its scoping are divided into separate components. More particularly, a CC generator component 612 can be utilized to generate a CC for a given scope corresponding to one or more applications 600, while a scope generator component 610 can be utilized to generate the scope as generally described herein.

Figure 7:
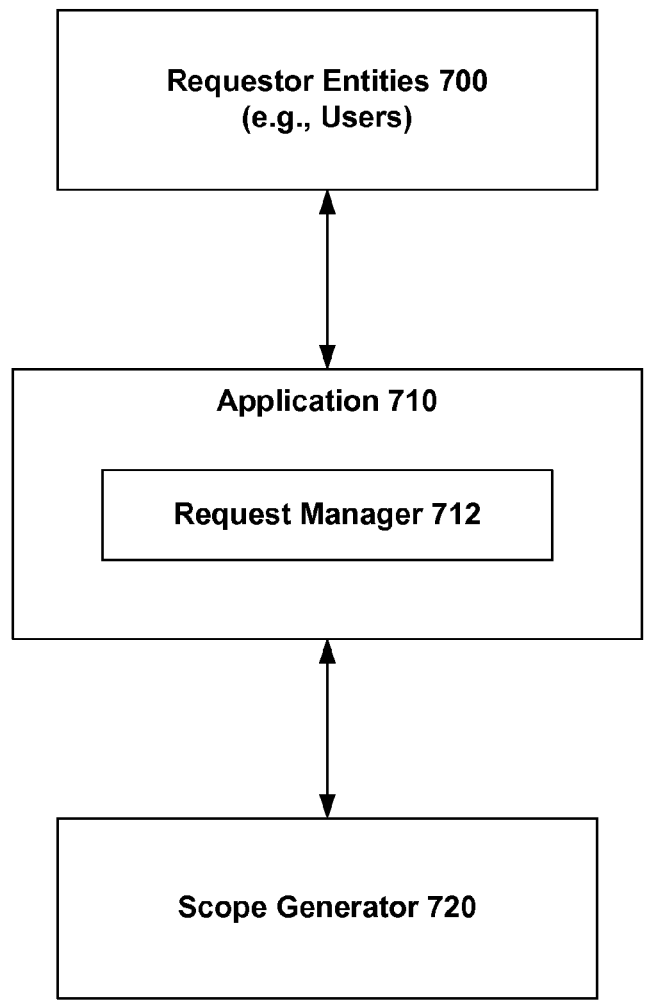
FIGS. 7-8 are block diagrams showing respective application request processing systems in accordance with one or more embodiments.

As another example implementation of the embodiments described herein, the various scoping management techniques provided herein can be utilized in the context of a network-based application. By way of example, a network application can operate as shown in FIG. 7, wherein one or more requestor entities (e.g., users) 700 interact with an application 710. The requestor entities 700 provide requests to the application 710, which are handled by a request manager component 712. The application 710, in turn, utilizes a scope generator component 720 to generate distinct scopes corresponding to the respective requestor entities 700.

Figure 8:
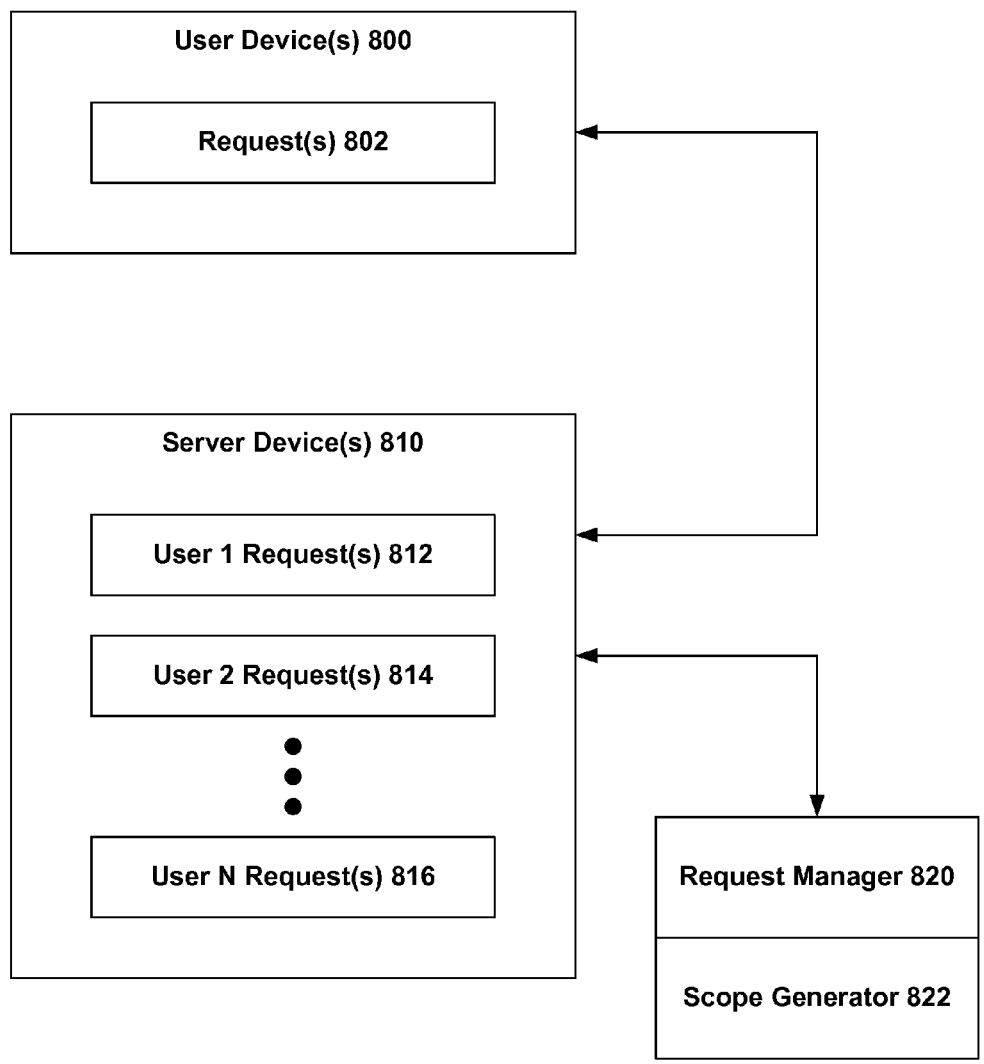

Operation of an exemplary network-based application in accordance with various embodiments herein is shown in further detail in FIG. 8. In an embodiment, one or more requests 802 can be made from a user device 800 corresponding to an application running on a server device 810. The request(s) can be made in any suitable number, and can occur in regular intervals (e.g., according to a preset refresh time) and/or in any other suitable manner. At the server device 810, requests 812-816 from respective user devices 800 are gathered and processed. Accordingly, while the system appears at a user device 800 to be only operating with respect to the user device 800, at the server device 810 requests for potentially many user devices 810 are processed.

Upon receiving a request 812-816, the server device 810 can utilize a request manager 820 and/or other suitable means to process the request 812-816. Processing of a request 812-816 can include, for example, authentication of the request, validation of the request, fulfillment of the request, and returning the results of the request to the user device(s) 800. In an embodiment, the request manager 820 can be associated with a scope generator component 822, which can scope the request manager 820 for individual user devices 800 as generally described herein. Accordingly, while the server device 810 operates on the application level, a distinct request manager instance can be allocated to respective user devices 800 through scoping.

Figure 9:
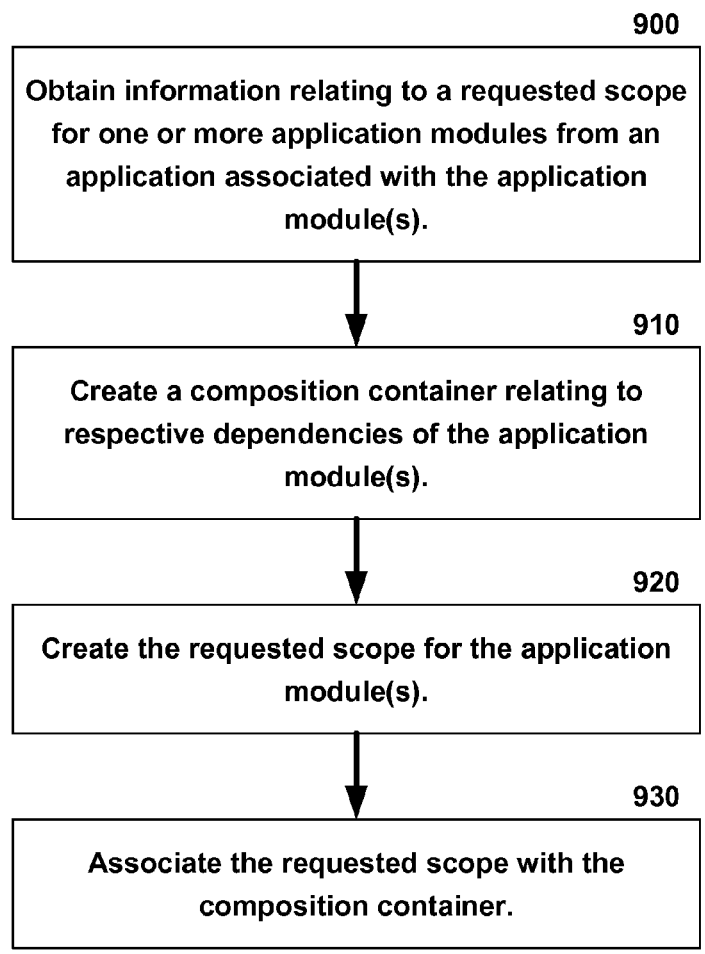
FIG. 9 is a flow diagram illustrating an exemplary non-limiting process for application scope creation and management.

FIG. 9 is a flow diagram illustrating an exemplary non-limiting process for application scope creation and management. At 900, information is obtained from an application that relates to a requested scope for one or more application modules associated with the application. At 910, a composition container is created that relates to respective dependencies of the application module(s). At 920, the requested scope is created for the application module(s). At 930, the requested scope is associated with the composition container.

Figure 10:
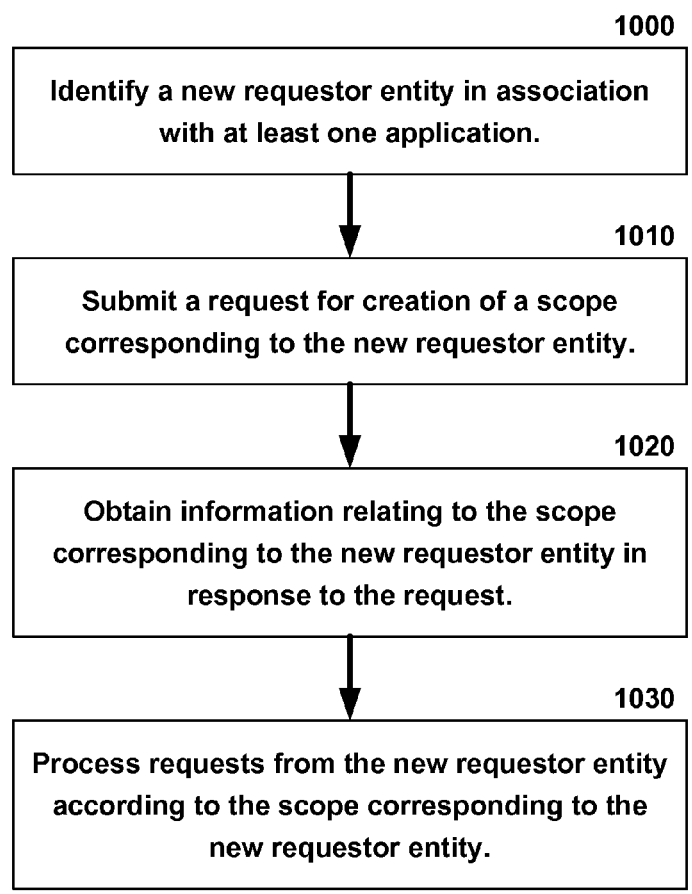
FIG. 10 is another flow diagram illustrating an exemplary non-limiting process for managing scoping corresponding to application requests.

FIG. 10 is another flow diagram illustrating an exemplary non-limiting process for managing scoping corresponding to application requests. At 1000, a new requestor entity is identified in association with at least one application. At 1010, a request is submitted for creation of a scope corresponding to the new requestor entity. At 1020, information is obtained in response to the request that relates to the scope corresponding to the new requestor entity. At 1030, requests from the new requestor entity are processed according to the scope corresponding to the new requestor entity.

Exemplary Networked and Distributed Environments

One of ordinary skill in the art can appreciate that the various embodiments of the scoping management systems and methods described herein can be implemented in connection with any computer or other client or server device, which can be deployed as part of a computer network or in a distributed computing environment. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the scoping creation and management mechanisms as described for various embodiments of the subject disclosure.

Figure 11:
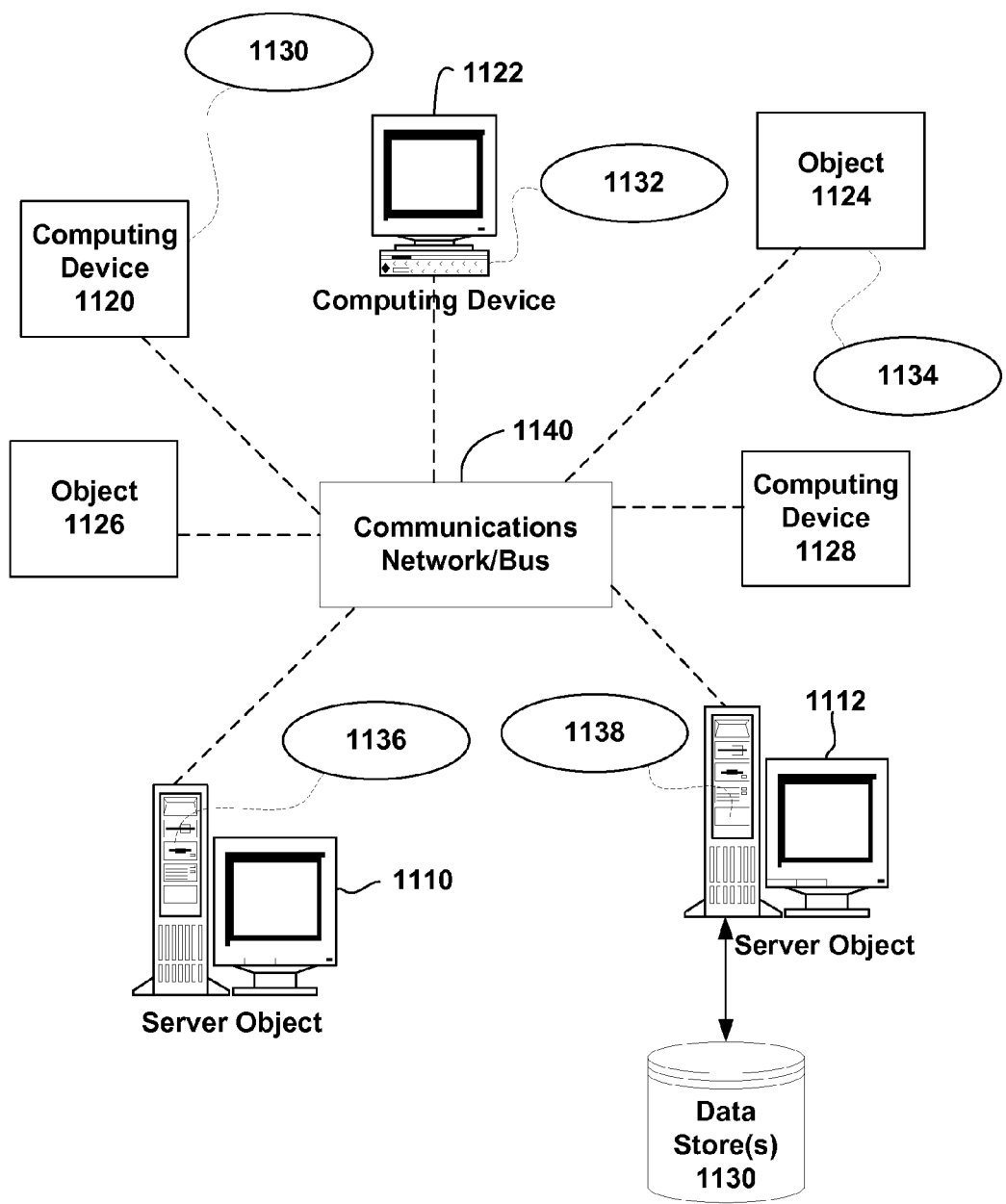
FIG. 11 is a block diagram representing exemplary non-limiting networked environments in which various embodiments described herein can be implemented.

FIG. 11 provides a schematic diagram of an exemplary networked or distributed computing environment. The distributed computing environment comprises computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138. It can be appreciated that computing objects 1110, 1112, etc. and computing objects or devices 1120, 1122, 1124, 1126, 1128, etc. may comprise different devices, such as personal digital assistants (PDAs), audio/video devices, mobile phones, MP3 players, personal computers, laptops, etc.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1140, either directly or indirectly. Even though illustrated as a single element in FIG. 11, communications network 1140 may comprise other computing objects and computing devices that provide services to the system of FIG. 11, and/or may represent multiple interconnected networks, which are not shown. Each computing object 1110, 1112, etc. or computing object or device 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of the scoping management techniques provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the scoping management systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 11, as a non-limiting example, computing objects or devices 1120, 1122, 1124, 1126, 1128, etc. can be thought of as clients and computing objects 1110, 1112, etc. can be thought of as servers where computing objects 1110, 1112, etc., acting as servers provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1140 or bus is the Internet, for example, the computing objects 1110, 1112, etc. can be Web servers with which other computing objects or devices 1120, 1122, 1124, 1126, 1128, etc. communicate via any of a number of known protocols, such as the hypertext transfer protocol (HTTP). Computing objects 1110, 1112, etc. acting as servers may also serve as clients, e.g., computing objects or devices 1120, 1122, 1124, 1126, 1128, etc., as may be characteristic of a distributed computing environment.

Exemplary Computing Device

As mentioned, advantageously, the techniques described herein can be applied to any device where it is desirable to manage creation of component scopes associated with a computing system. It can be understood, therefore, that handheld, portable and other computing devices and computing objects of all kinds are contemplated for use in connection with the various embodiments, i.e., anywhere that computing applications may be utilized. Accordingly, the below general purpose remote computer described below in FIG. 12 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 12:
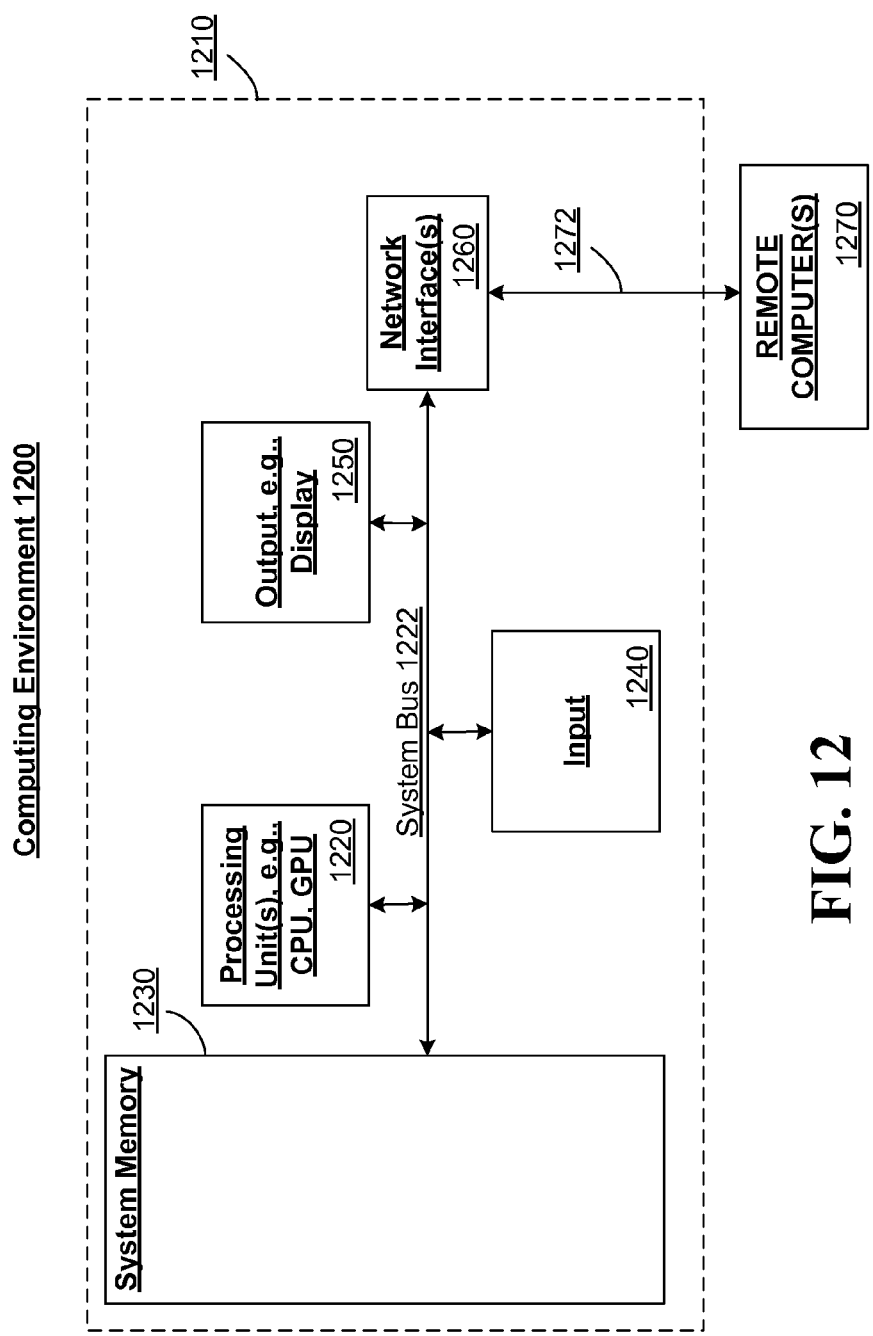
FIG. 12 is a block diagram representing an exemplary non-limiting computing system or operating environment in which one or more aspects of various embodiments described herein can be implemented.

FIG. 12 thus illustrates an example of a suitable computing system environment 1200 in which one or aspects of the embodiments described herein can be implemented, although as made clear above, the computing system environment 1200 is only one example of a suitable computing environment and is not intended to suggest any limitation as to scope of use or functionality. Neither should the computing system environment 1200 be interpreted as having any dependency or requirement relating to any one or combination of components illustrated in the exemplary computing system environment 1200.

With reference to FIG. 12, an exemplary remote device for implementing one or more embodiments includes a general purpose computing device in the form of a computer 1210. Components of computer 1210 may include, but are not limited to, a processing unit 1220, a system memory 1230, and a system bus 1222 that couples various system components including the system memory to the processing unit 1220.

Computer 1210 typically includes a variety of computer readable media and can be any available media that can be accessed by computer 1210. The system memory 1230 may include computer storage media in the form of volatile and/or nonvolatile memory such as read only memory (ROM) and/or random access memory (RAM). By way of example, and not limitation, system memory 1230 may also include an operating system, application programs, other program modules, and program data.

A user can enter commands and information into the computer 1210 through input devices 1240. A monitor or other type of display device is also connected to the system bus 1222 via an interface, such as output interface 1250. In addition to a monitor, computers can also include other peripheral output devices such as speakers and a printer, which may be connected through output interface 1250.

The computer 1210 may operate in a networked or distributed environment using logical connections to one or more other remote computers, such as remote computer 1270. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to manage scoping of code blocks.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A program component scoping management system, comprising the following processor-executable components:
   an application component including one or more application module components, the application component configured to provide or provide access to at least one service via the one or more application module components; and
   a scope generator component configured to receive information relating to a requested scope corresponding to a selected one of the application module components and to create a composition container to manage respective dependencies of the selected application module component, create the requested scope, and assign the requested scope to the composition container in response to the information received from the application component,
   wherein the requested scope identifies component values that are shared between the selected application module component and other application module components used in the application,
   wherein a dependency is a component used in the selected application module component,
   wherein the composition container is used to compose the selected application module component into an assembled format.

2. The system according to claim 1, wherein at least a portion of the one or more application module components correspond to application windows.

3. The system according to claim 1, wherein the requested scope corresponds to an entity submitting one or more requests according to the at least one service.

4. The system according to claim 1, wherein the scope generator component comprises:
   a scope analysis component configured to verify validity of the requested scope and to prevent creation of the composition container if the requested scope is determined to be invalid.

5. The system according to claim 4, wherein the scope analysis component is further configured to obtain scope information relating to a scope associated with the selected application module component and to verify validity of the requested scope at least in part by determining whether the requested scope is accessible from the scope associated with the application module component.

6. The system according to claim 1, wherein the scope generator component is associated with a composition container corresponding to a parent application module component of the selected application module component.

7. The system according to claim 1, wherein the scope generator component is further configured to create the requested scope based at least in part on a static generic parameter that defines the one or more application module components.

8. The system according to claim 1, wherein the scope generator component comprises:
   a composition container setup component configured to create the composition container;
   wherein the scope generator component creates the requested scope and assigns the requested scope to the composition container created by the composition container setup component.

9. The system according to claim 1, wherein the application component is further configured to submit the information relating to the requested scope to the scope generator component via an application programming interface (API) associated with the scope generator component.

10. A method for managing component scopes in a computing system, comprising:
    obtaining information relating to a requested scope for one or more application modules, the the one or more application modules part of an application;
    creating a composition container that manages respective dependencies of the one or more application modules and other application modules used in the application;
    creating the requested scope for the one or more application modules; and
    associating the requested scope with the composition container,
    wherein the requested scope identifies component values that are shared between the one or more application modules and the other application modules,
    wherein a dependency is a component used in an application module,
    wherein the composition container is used to compose the application modules into an assembled format.

11. The method of claim 10, further comprising:
    verifying validity of the requested scope;
    wherein the creating the requested scope comprises abstaining from creating the requested scope if the requested scope is invalid.

12. The method of claim 11, wherein the verifying comprises:
    identifying a requestor scope associated with the information relating to the requested scope; and
    verifying that the requested scope is accessible by the requestor scope.

13. The method of claim 10, wherein the creating the requested scope comprises:
    creating the requested scope based at least in part on a static parameter that generically defines the one or more application modules.

14. The method of claim 10, wherein the obtaining comprises:
    obtaining the information relating to the requested scope from the application via a scoping control application programming interface (API) call.

15. The method of claim 10, wherein:
    the creating a composition container comprises creating the composition container independently of the application; and
    the creating the requested scope comprises creating the requested scope independently of the application.

16. The method of claim 10, further comprising:
    obtaining information relating to at least one to-be-terminated scope from the application; and
    terminating the at least one to-be-terminated scope.

17. A computer-readable storage device comprising instructions that, when executed on a processor, cause the processor to perform actions comprising:
    obtaining information from an application relating to a requested scope for an application component, the application invoking an instance of the application component;
    creating a composition container that manages dependencies of the application component and instances of other application components used in the application;
    creating the requested scope for the instance of the application component; and
    associating the requested scope with the composition container,
    wherein the requested scope identifies component values that are shared between the instance of the application component and the instances of the other application components,
    wherein a dependency is a component used in the application component,
    wherein the composition container is used to compose the application component into an assembled format.

18. The device of claim 17, the actions further comprising:
    verifying validity of the requested scope;
    wherein the creating the requested scope comprises abstaining from creating the requested scope if the requested scope is invalid.

19. The device of claim 18, wherein the verifying comprises:
    identifying a requestor scope associated with the information relating to the requested scope; and
    verifying that the requested scope is accessible by the requestor scope.

20. The device of claim 17, wherein the creating the requested scope comprises:
    creating the requested scope based at least in part on a static parameter that generically defines the one application component.

* * * * *